(12) United States Patent
Tsuyoshi et al.

(10) Patent No.: US 10,460,877 B2
(45) Date of Patent: Oct. 29, 2019

(54) THIN-FILM CAPACITOR INCLUDING GROOVE PORTIONS

(71) Applicant: TDK CORPORATION, Tokyo (JP)

(72) Inventors: Atsuhiro Tsuyoshi, Tokyo (JP); Akifumi Kamijima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/603,743

(22) Filed: May 24, 2017

(65) Prior Publication Data
US 2017/0345576 A1  Nov. 30, 2017

(30) Foreign Application Priority Data

May 27, 2016  (JP) .................. 2016-106387
May 27, 2016  (JP) .................. 2016-106392
Apr. 7, 2017  (JP) .................. 2017-077075

(51) Int. Cl.
| | | |
|---|---|---|
| H01G 4/33 | (2006.01) | |
| H01G 4/012 | (2006.01) | |
| H01G 4/232 | (2006.01) | |
| H01G 4/10 | (2006.01) | |
| H01G 4/008 | (2006.01) | |

(52) U.S. Cl.
CPC ............. *H01G 4/33* (2013.01); *H01G 4/0085* (2013.01); *H01G 4/012* (2013.01); *H01G 4/10* (2013.01); *H01G 4/232* (2013.01)

(58) Field of Classification Search
CPC combination set(s) only.
See application file for complete search history.

(56) References Cited

U.S. PATENT DOCUMENTS

| | | | |
|---|---|---|---|
| 5,153,813 A | 10/1992 | Oehrlein et al. | |
| 5,155,657 A | 10/1992 | Oehrlein et al. | |
| 5,678,486 A | 10/1997 | Bachmeir et al. | |
| 5,858,477 A | 1/1999 | Veerasamy et al. | |
| 6,190,964 B1 | 2/2001 | Winters | |
| 6,537,668 B1 | 3/2003 | Vijayen et al. | |
| 6,544,627 B1 | 4/2003 | Vijayen et al. | |
| 7,180,155 B2 * | 2/2007 | Takeshima | H01G 4/1218 257/532 |
| 2003/0148103 A1 | 8/2003 | Vijayen et al. | |

(Continued)

FOREIGN PATENT DOCUMENTS

| | | |
|---|---|---|
| JP | S55-080313 A | 6/1980 |
| JP | S59-42965 B2 | 10/1984 |

(Continued)

*Primary Examiner* — David M Sinclair
(74) *Attorney, Agent, or Firm* — Oliff PLC

(57) ABSTRACT

In a thin-film capacitor, a first extraction electrode provided along a side surface of a first groove portion is in contact with a first electrode layer and is not in contact with a second electrode layer. Also, a second extraction electrode provided along a side surface of a second groove portion is in contact with the second electrode layer exposed on the side surface of the second groove portion and is not in contact with the first electrode layer. Thus, a capacitor structure in which the first electrode layer in contact with the first extraction electrode and the second electrode layer in contact with the second extraction electrode are laminated with a dielectric layer therebetween is formed between the first groove portion and the second groove portion.

9 Claims, 4 Drawing Sheets

(56) References Cited

U.S. PATENT DOCUMENTS

| | | | |
|---|---|---|---|
| 2003/0152746 A1 | 8/2003 | Vijayen et al. | |
| 2004/0130849 A1* | 7/2004 | Kurihara | H01G 4/228 361/311 |
| 2004/0161579 A1 | 8/2004 | Veerasamy et al. | |
| 2005/0194575 A1* | 9/2005 | Satou | H01B 1/16 252/500 |
| 2006/0180938 A1* | 8/2006 | Kurihara | H01L 21/4853 257/773 |
| 2006/0288938 A1 | 12/2006 | Veerasamy et al. | |
| 2007/0098979 A1 | 5/2007 | Vijayen et al. | |
| 2007/0098980 A1 | 5/2007 | Vijayen et al. | |
| 2009/0162572 A1 | 6/2009 | Veerasamy et al. | |
| 2009/0186150 A1* | 7/2009 | Kurokawa | C01G 33/006 427/125 |
| 2011/0019335 A1* | 1/2011 | Wu | H01G 4/005 361/303 |
| 2011/0147888 A1 | 6/2011 | Steigerwald et al. | |
| 2011/0233722 A1* | 9/2011 | Liang | H01G 4/232 257/532 |
| 2013/0194714 A1* | 8/2013 | Nakaiso | H01L 23/5223 361/301.2 |
| 2013/0342960 A1 | 12/2013 | Saita et al. | |
| 2016/0071651 A1* | 3/2016 | Kurosawa | H01G 4/306 361/304 |
| 2017/0194419 A1* | 7/2017 | Lee | H01L 27/016 |

FOREIGN PATENT DOCUMENTS

| | | | |
|---|---|---|---|
| JP | S61-14648 B2 | 4/1986 | |
| JP | H05-218301 A | 8/1993 | |
| JP | H05-304254 A | 11/1993 | |
| JP | H06-85196 A | 3/1994 | |
| JP | H07-77260 B2 | 8/1995 | |
| JP | H10-84097 A | 3/1998 | |
| JP | 2000-049303 A | 2/2000 | |
| JP | 2000-174212 A | 6/2000 | |
| JP | 2003-007565 A | 1/2003 | |
| JP | 2012-530384 A | 11/2012 | |
| JP | 2014-007239 A | 1/2014 | |
| WO | WO-2007010681 A1 * | 1/2007 | H01G 4/33 |
| WO | 2007/046173 A1 | 4/2007 | |

* cited by examiner

THIN-FILM CAPACITOR INCLUDING GROOVE PORTIONS

CROSS-REFERENCE TO RELATED APPLICATIONS

This application is based upon and claims the benefit of priority from Japanese Patent Applications No. 2016-106387 and No. 2016-106392, both filed May 27, 2016, and No. 2017-077075, filed Apr. 7, 2017. The entire contents of the prior applications are incorporated herein by reference.

TECHNICAL FIELD

The present disclosure relates to a thin-film capacitor.

BACKGROUND

Various types of thin-film capacitor such as conventional capacitors disclosed in Japanese Unexamined Patent Publication No. 55-80313 (Patent Literature 1), Japanese Unexamined Patent Publication No 2014-7239 (Patent Literature 2), and PCT International Publication No. WO 2007/046173 (Patent Literature 3) have been proposed.

However, in the thin-film capacitor according to the conventional technology, the number of capacitors capable of being mounted per unit area is small, and technology for enabling more capacitors to be mounted is desired. Therefore, the inventors have intensively studied the configuration of the thin-film capacitor and have newly found technology for enabling more capacitors to be mounted as a result.

SUMMARY

According to the present disclosure, a thin-film capacitor which enables more capacitors to be mounted is provided.

According to an aspect of the present disclosure, a thin-film capacitor includes a laminate having a laminated structure including a first electrode layer, a second electrode layer, and a dielectric layer interposed between the first and second electrode layers; a first groove portion and a second groove portion provided on one end surface side of the laminate in a laminating direction; and a pair of extraction electrodes configured to cross the first groove portion and the second groove portion, respectively, and provided along both side surfaces of each of the first and second groove portions, wherein a first extraction electrode provided in the first groove portion among the pair of extraction electrodes is in contact with the first electrode layer exposed on the side surface of the first groove portion and is not in contact with the second electrode layer, and wherein a second extraction electrode provided in the second groove portion among the pair of extraction electrodes is in contact with the second electrode layer exposed on the side surface of the second groove portion and is not in contact with the first electrode layer.

In the above-described thin-film capacitor, a capacitor structure in which the first groove portion and the second groove portion are provided on one end surface side of the laminate and the first electrode layer in contact with the first extraction electrode and the second electrode layer in contact with the second extraction electrode are laminated with a dielectric layer therebetween between the first groove portion and the second groove portion is formed. In such a capacitor structure, by providing the first groove portion and the second groove portion similar to each other and the pair of extraction electrodes in the laminate, the number thereof can be easily increased.

In the thin-film capacitor according to another aspect of the present disclosure, an end surface of the second electrode layer on the first groove portion side is retracted away from the side surface of the first groove portion. Also, an insulator is provided between the end surface of the second electrode layer on the first groove portion side and the side surface of the first groove portion.

In the thin-film capacitor according to another aspect of the present disclosure, an end surface of the first electrode layer on the second groove portion side is retracted away from the side surface of the second groove portion. Also, an insulator is provided between the end surface of the first electrode layer on the second groove portion side and the side surface of the second groove portion.

According to an aspect of the present disclosure, a thin-film capacitor includes a laminate having a laminated structure including a first electrode layer, a second electrode layer, and a dielectric layer interposed between the first and second electrode layers; a first through hole and a second through hole passing through the laminate in a laminating direction; and a pair of through electrodes passing through the first through hole and the second through hole, respectively, and having outer circumferential surfaces along inner side surfaces of each of the first and second through holes, wherein a first through electrode passing through the first through hole among the pair of through electrodes is in contact with the first electrode layer exposed on the inner side surface of the first through hole and is not in contact with the second electrode layer, and wherein a second through electrode passing through the second through hole among the pair of through electrodes is in contact with the second electrode layer exposed on the inner side surface of the second through hole and is not in contact with the first electrode layer.

In the above-described thin-film capacitor, a capacitor structure in which a first through hole and a second through hole passing through the laminate are provided, and the first electrode layer in contact with the first through electrode and the second electrode layer in contact with the second through electrode are laminated with the dielectric layer therebetween is formed. In such a capacitor structure, by providing the first through hole and the second through hole similar to each other and the pair of through electrodes in the laminate, the number thereof can be easily increased.

In the thin-film capacitor according to another aspect of the present disclosure, an inner circumferential surface of an edge portion of the second electrode layer surrounding the first through hole is retracted away from the inner side surface of the first through hole. Also, an insulator is provided between the inner circumferential surface of the edge portion of the second electrode layer surrounding the first through hole and the inner side surface of the first through hole.

In the thin-film capacitor according to another aspect of the present disclosure, an inner circumferential surface of an edge portion of the first electrode layer surrounding the second through hole is retracted away from the inner side surface of the second through hole. Also, an insulator is provided between the inner circumferential surface of the edge portion of the first electrode layer surrounding the second through hole and the inner side surface of the second through hole.

DETAILED DESCRIPTION

Embodiments of the present disclosure will be described in detail below with reference to the accompanying drawings. In the description, the same reference signs are used for the same elements or elements having the same functions, and redundant description will be omitted.

(First Embodiment)

Figure 1:
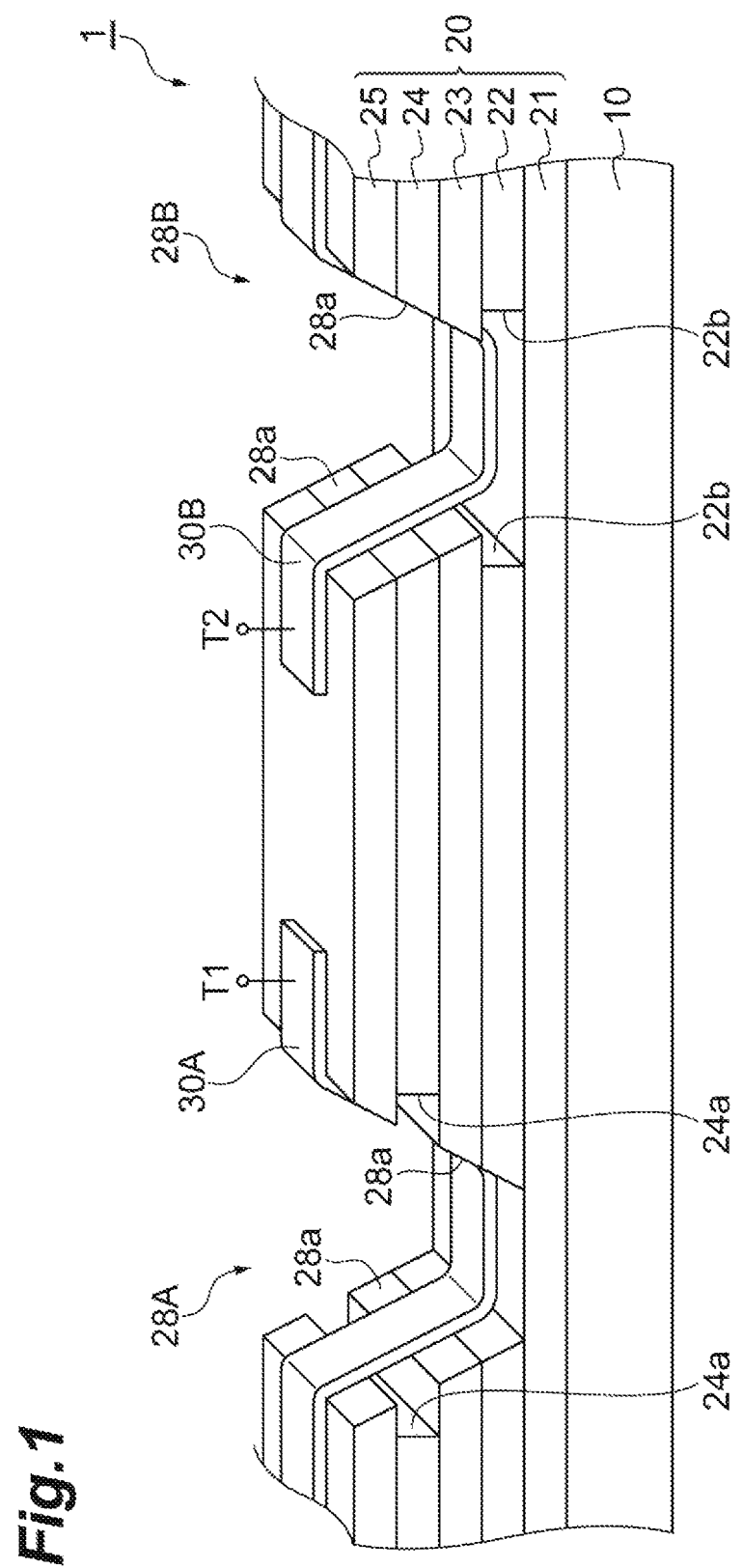
FIG. 1 is a perspective view illustrating a thin-film capacitor according to a first embodiment.
Figure 2:
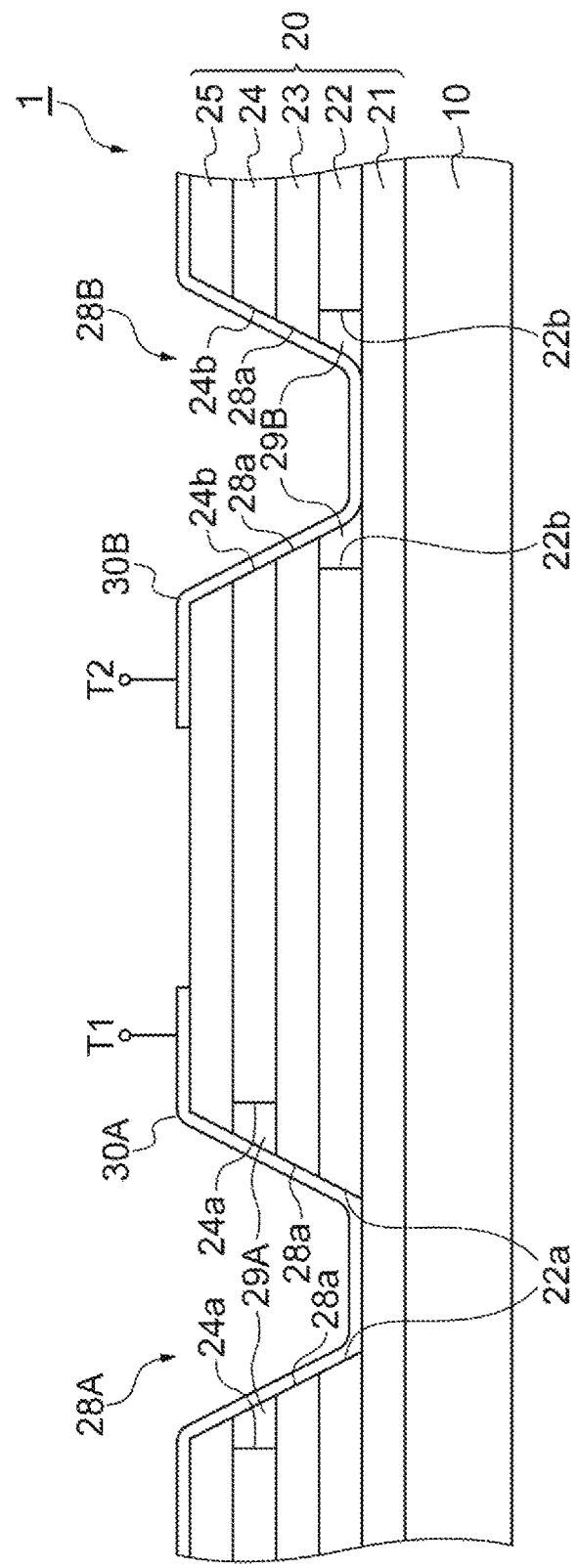
FIG. 2 is a side view of the thin-film capacitor of FIG. 1.

As illustrated in FIGS. 1 and 2, a thin-film capacitor 1 according to the first embodiment is configured to include a substrate 10, a laminate 20 laminated on the substrate 10, and a pair of extraction electrodes 30A and 30B. As an example, external dimensions of the thin-film capacitor 1 are 0.6 mm in length, 0.3 mm in width and 0.15 mm in height. The thin-film capacitor 1 is a small-sized and large-capacity laminated capacitor and can be used as an on-vehicle capacitor, for example, but is not limited to this application.

The substrate 10 has a plate shape or a foil shape, and is made of, for example, a metal such as Ni. The substrate 10 illustrated in FIG. 1 is strip-like, has a constant width, and extends long in one direction.

The laminate 20 has a laminated structure in which a plurality of layers are laminated, and includes a substrate protection layer 21, a first electrode layer 22, a dielectric layer 23, a second electrode layer 24, and an insulating layer 25 in this order sequentially from a direction close to the substrate 10.

The substrate protection layer 21 is made of an insulating material such as a metal oxide, and made of zirconium oxide ($ZrO_2$, $ZrO_{2.95}$, or the like) as an example. In addition to the zirconium oxide, for example, an oxide such as aluminum oxide ($Al_2O_3$, $Al_2O_{2.95}$, or the like), silicon oxide ($SiO_2$, $SiO_{2.95}$, or the like.), or barium titanate ($BaTiO_3$ or the like), a nitride such as silicon nitride (SiN, $Si_3N_4$, $Si_3N_{3.95}$, or the like), a carbide such as AlTiC, or a compound or mixture thereof can be adopted as the constituent material of the substrate protection layer 21.

The first electrode layer 22 is an internal electrode layer connected to one extraction electrode 30A among the pair of extraction electrodes 30A and 30B. The first electrode layer 22 is made of a conductive material, and made of Ti as an example. Besides Ti, a metal such as Au, Ag, Pd, Ta, W, Ni, Cr, Cu, Al, or Fe, stainless steel (SUS), an Ag—Pd—Cu alloy (APC), or an alloy such as NiCr can be adopted as the conductive material constituting the first electrode layer 22.

The dielectric layer 23 is sandwiched between the first electrode layer 22 on a lower side and the second electrode layer 24 on an upper side and is interposed between the electrode layers 22 and 24. The dielectric layer 23 is made of an insulating material such as a metal oxide, and made of $Al_2O_3$ as an example. Besides $Al_2O_3$, for example, $ZrO_2$, $HfO_2$, or $BaTiO_3$ can be adopted as the constituent material of the dielectric layer 23.

The second electrode layer 24 is an internal electrode layer connected to the other extraction electrode 30B among the pair of extraction electrodes 30A and 30B. The second electrode layer 24 is made of a conductive material, and made of Cu as an example. Besides Cu, a metal such as Au, Ag, Pd, Ti, Ta, W, Ni, Cr, Al, or Fe, SUS, APC, or an alloy such as NiCr can be adopted as the conductive material constituting the second electrode layer 24.

The insulating layer 25 is made of an insulating material such as an insulating resin, and made of an epoxy resin as an example.

In the laminate 20, a first groove portion 28A and a second groove portion 28B are provided on an upper end surface side (that is, one end surface side in the laminating direction). The first groove portion 28A and the second groove portion 28B are provided in parallel to each other, and both extend in a width direction of the substrate 10. Although not illustrated in FIGS. 1 and 2, the first groove portion 28A and the second groove portion 28B are alternately arranged in a longitudinal direction of the substrate 10, and the laminate 20 is provided with a plurality of pairs of first groove portions 28A and second groove portions 28B.

Both of the first groove portion 28A and the second groove portion 28B extend from the upper end surface of the laminate 20 to the upper surface of the substrate protection layer 21 which is a lowermost layer of the laminate 20. Each of the groove portions 28A and 28B has an inverted trapezoidal cross section in which a width on the upper end surface side is wider than a width on the bottom side and the width is narrowed in the downward direction. Such groove portions 28A and 28B allow the partial removal of the first electrode layer 22, the dielectric layer 23, the second electrode layer 24, and the insulating layer 25 of the layers constituting the laminate 20 by etching and the substrate protection layer 21 can remain without being removed. Thereby, the upper surface of the substrate protection layer 21 is exposed on the bottoms of the groove portions 28A and 28B, and end surfaces of the first electrode layer 22, the dielectric layer 23, the second electrode layer 24, and the insulating layer 25 are exposed on side surfaces of the groove portions 28A and 28B.

The pair of extraction electrodes 30A and 30B are provided on the laminate 20 so that they cross the groove portions 28A and 28B. Specifically, one extraction electrode (first extraction electrode) 30A among the pair of extraction electrodes 30A and 30B is provided to cross the first groove portion 28A, and connected to an external terminal T1. The other extraction electrode (second extraction electrode) 30B among the pair of extraction electrodes 30A and 30B is provided to cross the second groove portion 28B. The extraction electrodes 30B is connected to an external terminal T2 having a polarity different from that of the external terminal T1. Each of the extraction electrodes 30A and 30B is made of a conductive material such as metal, and made of Cu as an example.

The extraction electrodes 30A and 30B are provided along side surfaces 28a of the groove portions 28A and 28B. Each of the extraction electrodes 30A and 30B is connected to one of the first electrode layer 22 and the second electrode layer 24 exposed on the side surface 28a of the groove portions 28A and 28B. Specifically, the first extraction electrode 30A is in contact with the first electrode layer 22 exposed on the side surface 28a of the first groove portion 28A, but is not in contact with the second electrode layer 24. Also, the second extraction electrode 30B is in contact with the second electrode layer 24 exposed on the side surface 28a of the second groove portion 28B, but is not in contact with the first electrode layer 22.

Here, connected states of the pair of extraction electrodes 30A and 30B and the pair of electrode layers 22 and 24 in each groove portion 28A and 28B will be described in more detail with reference to FIG. 2.

As illustrated in FIG. 2, an end surface 24a of the second electrode layer 24 on the first groove portion 28A side is retracted away from the side surface 28a of the first groove portion 28A. Also, an end surface 24b of the second electrode layer 24 on the second groove portion 28B side is not retracted, but is provided along the side surface 28a of the second groove portion 28B. An insulator 29A is arranged between the end surface 24a of the second electrode layer 24 on the first groove portion 28A side and the side surface 28a of the first groove portion 28A. The insulator 29A can be made of various known insulating materials, and can be made of, for example, an insulating resin, a metal oxide such as $Al_2O_3$, TEOS, or the like.

An end surface 22a of the first electrode layer 22 on the first groove portion 28A side is provided along the side surface 28a of the first groove portion 28A. An end surface 22b of the first electrode layer 22 on the second groove portion 28B side is retracted away from the side surface 28a of the second groove portion 28B. An insulator 29B is arranged between the end surface 22b of the first electrode layer 22 on the second groove portion 28B side and the side surface 28a of the second groove portion 28B. Similar to the insulator 29A described above, the insulator 29B can be made of various known insulating materials, and can be made of a metal oxide such as $Al_2O_3$, TEOS, or the like.

Connected states of the pair of extraction electrodes 30A and 30B and the pair of electrode layers 22 and 24 described above can be obtained according to, for example, the following procedure.

(Step 1)

The substrate protection layer 21 is formed on the substrate 10. For example, a Ni foil with a thickness of 100 μm is used as the substrate 10, and a $ZrO_2$ layer (the substrate protection layer 21) with a thickness of 200 nm is formed on the Ni foil by sputtering.

(Step 2)

The first electrode layer 22, the dielectric layer 23, and the second electrode layer 24 are formed in this order on the substrate protection layer 21 of step 1. As an example, a Ti layer (the first electrode layer 22) with a thickness of 200 nm, an $Al_2O_3$ layer (the dielectric layer 23) with a thickness of 200 nm and a Cu layer (the second electrode layer 24) with a thickness of 200 nm are sequentially formed by sputtering.

(Step 3)

The surface of the second electrode layer 24 of step 2 is covered with a resist having openings in portions corresponding to the above-described groove portions 28A and 28B. Specifically, after the entire surface of the second electrode layer 24 is covered with the resist, the openings are provided by performing predetermined exposure and development.

(Step 4)

Dry etching is performed using the resist of step 3 to form the first groove portion 28A and the second groove portion 28B extending to the upper surface of the substrate protection layer 21. The width of each groove portion 28A or 28B (the length in the longitudinal direction of the substrate 10) can be, for example, 100 μm.

(Step 5)

After step 4, a portion other than the first groove portion 28A is covered with a resist, and side etching of the first groove portion 28A is performed with ammonium peroxodisulfate. The second electrode layer 24 (the Cu layer) exposed on the side surface 28a of the first groove portion 28A is selectively etched by ammonium peroxodisulfate and the end surface 24a of the second electrode layer 24 on the first groove portion 28A side is retracted away from the side surface 28a of the first groove portion 28A. At this time, the side-etched length is 3 μm as an example. In the etching with the ammonium peroxodisulfate, the first electrode layer 22 (the Ti layer) exposed on the side surface 28a of the first groove portion 28A and the substrate protection layer 21 (the $ZrO_2$ layer) exposed on the bottom surface are not substantially etched.

(Step 6)

After removal of the resist of step 5, a portion other than the second groove portion 28B is covered with a resist, and side etching of the second groove portion 28B is performed with a mixed solution of hydrogen peroxide water and ammonia. The first electrode layer 22 (the Ti layer) exposed on the side surface 28a of the second groove portion 28B is selectively etched with the mixed solution of hydrogen peroxide water and ammonia, and an end surface 22b of the first electrode layer 22 on the second groove portion 28B side is retracted away from the side surface 28a of the second groove portion 28B. At this time, the side-etched length is 3 μm as an example. In the etching with the mixed solution of hydrogen peroxide water and ammonia, the second electrode layer 24 (the Cu layer) exposed on the side surface 28a of the second groove portion 28B and the substrate protection layer 21 (the $ZrO_2$ layer) exposed on the bottom surface are not substantially etched.

(Step 7)

After removal of the resist of step 6, covering with a positive resist is performed, development is performed after entire surface exposure, and a resin insulating layer is provided as the insulators 29A and 29B on the side-etched portions of the first groove portion 28A and the second groove portion 28B. As a manufacturing method of providing the insulators 29A and 29B on the side-etched portions, a manufacturing method using atomic layer deposition (ALD) or electrophoresis can also be adopted.

(Step 8)

The end surfaces of the electrode layers 22 and 24 which are not provided with the insulators 29A and 29B are exposed on the side surfaces 28a of the first groove portion 28A and the second groove portion 28B by oxygen plasma, Cu plating is performed after a seed layer is formed by sputtering in a formation region of a pair of extraction electrodes 30A and 30B, and the pair of extraction electrodes 30A and 30B are formed.

As described above, the metal materials (Ti and Cu in the present embodiment) constituting the pair of electrode layers 22 and 24 are made different from each other, and a structure in which only one electrode layer 22 is exposed in one groove portion 28A and only the other electrode layer 24 is exposed in the other groove portion 28B is obtained by performing side etching of the groove portions 28A and 28B using two types of etchants for selectively etching the metal materials (ammonium peroxodisulfate and a mixed solution of hydrogen peroxide water and ammonia in this embodiment).

Thus, a capacitor structure having a simple configuration can be easily formed between both the groove portions 28A and 28B merely by providing the extraction electrodes 30A and 30B along the side surfaces 28a of the groove portions 28A and 28B after the groove portions 28A and 28B are formed in the laminate 20 with a predetermined etchant.

As described above, in the thin-film capacitor 1 according to the first embodiment, a capacitor structure in which the first groove portion 28A and the second groove portion 28B are provided on the upper end surface side of the laminate 20 and the first electrode layer 22 in contact with the first extraction electrode 30A and the second electrode layer 24 in contact with the second extraction electrode 30B are laminated with the dielectric layer 23 therebetween between the first groove portion 28A and the second groove portion 28B is formed.

In the first embodiment, combinations of two types of metal materials constituting the pair of electrode layers 22 and 24 and two types of etchants for selectively etching the metal materials are as shown in the following Table 1.

TABLE 1

|  | Constituent material | Etchant |
|---|---|---|
| First electrode layer | Ti | Mixed solution of hydrogen peroxide water and ammonia |
| Second electrode layer | Cu | Ammonium peroxodisulfate |
| Substrate protection layer | $ZrO_2$ | |

The combination of the constituent material and the etchant shown in Table 1 can be appropriately exchanged. That is, the first electrode layer 22 may be made of Cu, the side etching of the first electrode layer 22 may be performed with a mixed solution of hydrogen peroxide water and ammonia, and the second electrode layer 24 may be made of Ti, and the side etching of the second electrode layer 24 may be performed with ammonium peroxodisulfate.

Capacitor structures connected in series are continuously formed by alternately arranging the first groove portion 28A and the second groove portion 28B illustrated in FIGS. 1 and 2 in the longitudinal direction of the substrate 10 and providing the above-described extraction electrodes 30A and 30B in the groove portions 28A and 28B. That is, merely by performing etching formation of the groove portions 28A and 28B in the laminate 20 and performing plating formation of the extraction electrodes 30A and 30B along the side surfaces 28a of the groove portions 28A and 28B using the above-described manufacturing method, a plurality of capacitor structures can be easily formed and the number of capacitor structures can easily be increased.

Also, by adjusting a separation distance between the first groove portion 28A and the second groove portion 28B, the capacitance of the capacitor structure provided therebetween can be easily adjusted. Furthermore, it is possible to easily form a plurality of capacitor structures having different capacitances on one substrate 10.

Although some of the thin-film capacitors according to the conventional technology have a laminate having a configuration in which narrower layers are laminated on a wide layer, it is necessary to provide a different mask for each layer in the laminate having a cross section of a trapezoid having such a stepped side surface and a work process and an increase in cost are caused. On the other hand, according to the above-described thin-film capacitor 1, it is unnecessary to provide different masks for each layer and it is possible to reduce the work process and cost because the formation of the groove portions 28A and 28B in the laminate 20 is completed with only one removing step (etching, ion milling, or the like). As the work process, 20 exposure and development operations are required according to the conventional technology when a laminate having a 10-layer structure is considered, but it is sufficient to perform exposure and development four times in the manufacturing method according to the above-described embodiment. Also, because superposition with high precision is unnecessary, a simple method such as printing can be used.

Furthermore, in the thin-film capacitor according to the conventional technology, the capacitance is reduced by the width reduction because the upper layer of the laminate needs to be narrowed. On the other hand, in the thin-film capacitor 1 according to the above-described embodiment, it is not necessary to narrow the width, and it is possible to obtain large capacitance because the extraction electrodes 30A and 30B are in contact with the end surfaces 22a and 24b of the electrode layers 22 and 24. In other words, the same capacitance can be realized with a smaller thin-film capacitor.

Also, according to the above-described thin-film capacitor 1, wiring routing can be reduced as compared with the conventional technology. This makes it easy to adjust series resistance and equivalent series inductance, and an adjustment range on a low series resistance side expands particularly.

Furthermore, according to the thin-film capacitor 1, the number of terminals of the extraction electrodes 30A and 30B can be easily increased.

(Second Embodiment)

As in the first embodiment, the thin-film capacitor 1 according to the second embodiment is configured to include a substrate 10, a laminate 20 laminated on the substrate 10, and a pair of extraction electrodes 30A and 30B.

In the second embodiment, constituent materials of layers 21 to 25 of the laminate 20 and the substrate 10 are different from the constituent materials of the first embodiment, and others are the same as or similar to those of the first embodiment.

The substrate 10 of the second embodiment is made of silicon. The substrate protection layer 21, the first electrode layer 22, the dielectric layer 23, the second electrode layer 24 and the insulating layer 25 of the laminate 20 of the second embodiment are made of $Al_2O_3$, Ni, $HfO_2$, Cu, and $SiO_2$.

Also, in the second embodiment, as in the first embodiment, the pair of extraction electrodes 30A and 30B and the pair of electrode layers 22 and 24 illustrated in FIG. 2 are in a connected state and such a connected state can be obtained by, for example, the following procedure.

(Step 1)

A substrate protection layer 21 is formed on the substrate 10. As an example, a silicon wafer with a diameter of 6 inches is used as the substrate 10, and an $Al_2O_3$ layer (the substrate protection layer 21) with a thickness of 200 nm is formed on the silicon wafer in the ALB method.

(Step 2)

The first electrode layer 22, the dielectric layer 23, and the second electrode layer 24 are sequentially formed on the substrate protection layer 21 of step 1. As an example, a Ni layer (the first electrode layer 22) with a thickness of 200 nm, an $HfO_2$ layer (the dielectric layer 23) with a thickness of 200 nm, and a Cu layer (the second electrode layer 24) with a thickness of 200 nm are formed in this order. The Ni layer and the Ti layer are formed by sputtering and the $HfO_2$ layer is formed in the ALD method.

(Step 3)

The surface of the second electrode layer 24 of step 2 is covered with a resist having openings in portions corresponding to the groove portions 28A and 28B. Specifically, after the entire surface of the second electrode layer 24 is covered with a resist, openings are provided by performing predetermined exposure and development.

(Step 4)

Ion milling is performed using the resist of step 3 to form the first groove portion 28A and the second groove portion 28B extending to the upper surface of the substrate protection layer 21. A width of each groove portion 28A or 28B (the length of the substrate 10 in the longitudinal direction) can be, for example, 100 μm.

(Step 5)

After step 4, a portion other than the first groove portion 28A is covered with a resist, and side etching of the first groove portion 28A is performed with ammonium peroxodisulfate. The second electrode layer 24 (the Cu layer) exposed on a side surface 28a of the first groove portion 28A is selectively etched with ammonium peroxodisulfate and an end surface 24a of the second electrode layer 24 on the first groove portion 28A side is retracted away from the side surface 28a of the first groove portion 28A. At this time, the side-etched length is 3 μm as an example. In the etching with the ammonium peroxodisulfate, the first electrode layer 22 (the Ni layer) exposed on the side surface 28a of the first groove portion 28A and the substrate protection layer 21 (the $Al_2O_3$ layer) exposed on the bottom surface are not substantially etched.

(Step 6)

After removal of the resist of step 5, a portion other than the second groove portion 28B is covered with a resist, and side etching of the second groove portion 28B is performed with a mixed solution of hydrogen peroxide water and nitric acid. The first electrode layer 22 (the Ni layer) exposed on the side surface 28a of the second groove portion 283 is selectively etched by the mixed solution of hydrogen peroxide water and nitric acid, and an end surface 22b of the first electrode layer 22 on the second groove portion 28B side is retracted away from the side surface 28a of the second groove portion 28B. At this time, the side-etched length is 3 μm as an example. In the etching with the mixed solution of hydrogen peroxide water and nitric acid, the second electrode layer 24 (the Cu layer) exposed on the side surface 28a of the second groove portion 28B and the substrate protection layer 21 (the $Al_2O_3$ layer) exposed on the bottom surface are not substantially etched.

(Step 7)

After removal of the resist of step 6, a film of $SiO_2$ is formed in a CVD method, an $SiO_2$ layer is provided as the insulating layer 25 on the upper surface of the second electrode layer 24, and an $SiO_2$ layer is provided as insulators 29A and 29B in the side-etched portions of the first groove portion 28A and the second groove portion 28B.

(Step 8)

End surfaces of the electrode layers 22 and 24 which are not provided with the insulator 29 are exposed on the side surfaces 28a of the first groove portion 28A and the second groove portion 28B by dry etching, and Cu plating is performed after a seed layer is formed in formation regions of a pair of extraction electrodes 30A and 30B by sputtering to form the pair of extraction electrodes 30A and 30B.

As described above, metal materials (Ni and Cu in the present embodiment) constituting the pair of electrode layers 22 and 24 are made different from each other and side etching is performed on the groove portions 28A and 28B using two types of etchants for selectively the metal materials (ammonium peroxodisulfate and a mixed solution of hydrogen peroxide water and nitric acid in the present embodiment), so that a structure in which only one electrode layer 22 is exposed in one groove portion 28A and only the other electrode layer 24 is exposed in the other groove portion 28B is obtained.

As described above, in the thin-film capacitor 1 according to the second embodiment, as in the thin-film capacitor 1 according to the first embodiment, a capacitor structure in which the first groove portion 28A and the second groove portion 28B are formed on the upper end surface side of the laminate and the first electrode layer 22 in contact with the first extraction electrode 30A and the second electrode layer 24 in contact with the second extraction electrode 30B are laminated with the dielectric layer 23 therebetween between the first groove portion 28A and the second groove portion 28B is formed.

In the second embodiment, the combinations of two types of metal materials constituting the pair of electrode layers 22 and 24 and two types of etchants for selectively etching the metal materials is as shown in the following Table 2.

TABLE 2

| | Constituent material | Etchant |
|---|---|---|
| First electrode layer | Ni | Mixed solution of hydrogen peroxide water and nitric acid |
| Second electrode layer | Cu | Ammonium peroxodisulfate |
| Substrate protection layer | $Al_2O_3$ | |

The combination of the constituent material and the etchant shown in Table 2 can be appropriately exchanged. That is, the first electrode layer 22 may be made of Cu, the side etching of the first electrode layer 22 may be performed with a mixed solution of hydrogen peroxide water and ammonia, the second electrode layer 24 may be made of Ni, and the side etching of the second electrode layer 24 may be performed with ammonium peroxodisulfate.

The first groove portion 28A and the second groove portion 28B illustrated in FIGS. 1 and 2 are alternately arranged in the longitudinal direction of the substrate 10, and the above-described extraction electrodes 30A and 30B are provided in the groove portions 28A and 28B, so that series-connected capacitor structures are formed continuously. That is, merely by performing etching formation of the groove portions 28A and 28B in the laminate 20 and plating formation of the extraction electrodes 30A and 30B along the side surfaces 28a of the groove portions 28A and 28B using the above-described manufacturing method, it is possible to easily form a plurality of capacitor structures and easily increase the number of capacitor structures that can be mounted per unit area.

Also, the thin-film capacitors shown in the first embodiment and the second embodiment are not limited to the above-described forms, and can be variously changed.

For example, although the laminate 20 has a single capacitor structure (that is, a structure in which a one layered dielectric is sandwiched between a first electrode layer and a second electrode layer), a laminate having a plurality of capacitor structures in a laminating direction obtained by alternately laminating a plurality of first electrode layers and a plurality of second electrode layers with a dielectric therebetween may be formed.

Also, the substrate 10 is not limited to a band shape having a narrow width in the longitudinal direction, and may be a rectangular shape having substantially the same length in a longitudinal direction and a transverse direction.

Furthermore, the insulators 29A and 29B are not provided and voids can be formed in portions of the insulators 29A and 29B. In this case, a non-contact state between the extraction electrode and the electrode layer can be realized by air or gas inside the voids.

Also, combinations of two types of metal materials constituting the pair of electrode layers 22 and 24 and two types of etchants for selectively etching the metal materials are not limited to the above-described combinations described above, and may be the following combinations of Tables 3 to 6.

TABLE 3

| | Constituent material | Etchant |
|---|---|---|
| First electrode layer | Pd | Iodine-based (I + KI) |
| Second electrode layer | Ni | Mixed solution of hydrogen peroxide water and nitric acid |
| Substrate protection layer | $BaTiO_3$ | |

TABLE 4

| | Constituent material | Etchant |
|---|---|---|
| First electrode layer | Cr | Potassium permanganate-based (KOH + $KMnO_4$) |
| Second electrode layer | Cu | Ferric chloride-based ($FeCl_3$ + HCl) |
| Substrate protection layer | $SiO_2$ | |

TABLE 5

| | Constituent material | Etchant |
|---|---|---|
| First electrode layer | W | Mixed solution of hydrogen peroxide water and ammonia |
| Second electrode layer | Cu | Ammonium peroxodisulfate |
| Substrate protection layer | $Al_2O_3$ | |

TABLE 6

| | Constituent material | Etchant |
|---|---|---|
| First electrode layer | APC | Phosphate-based |
| Second electrode layer | Ti | Mixed solution of hydrogen peroxide water and ammonia |
| Substrate protection layer | $Si_3N_4$ | |

The combinations of the constituent materials and the etchants shown in the above-described Tables 3 to 6 can also be appropriately exchanged.

(Third Embodiment)

Figure 3:
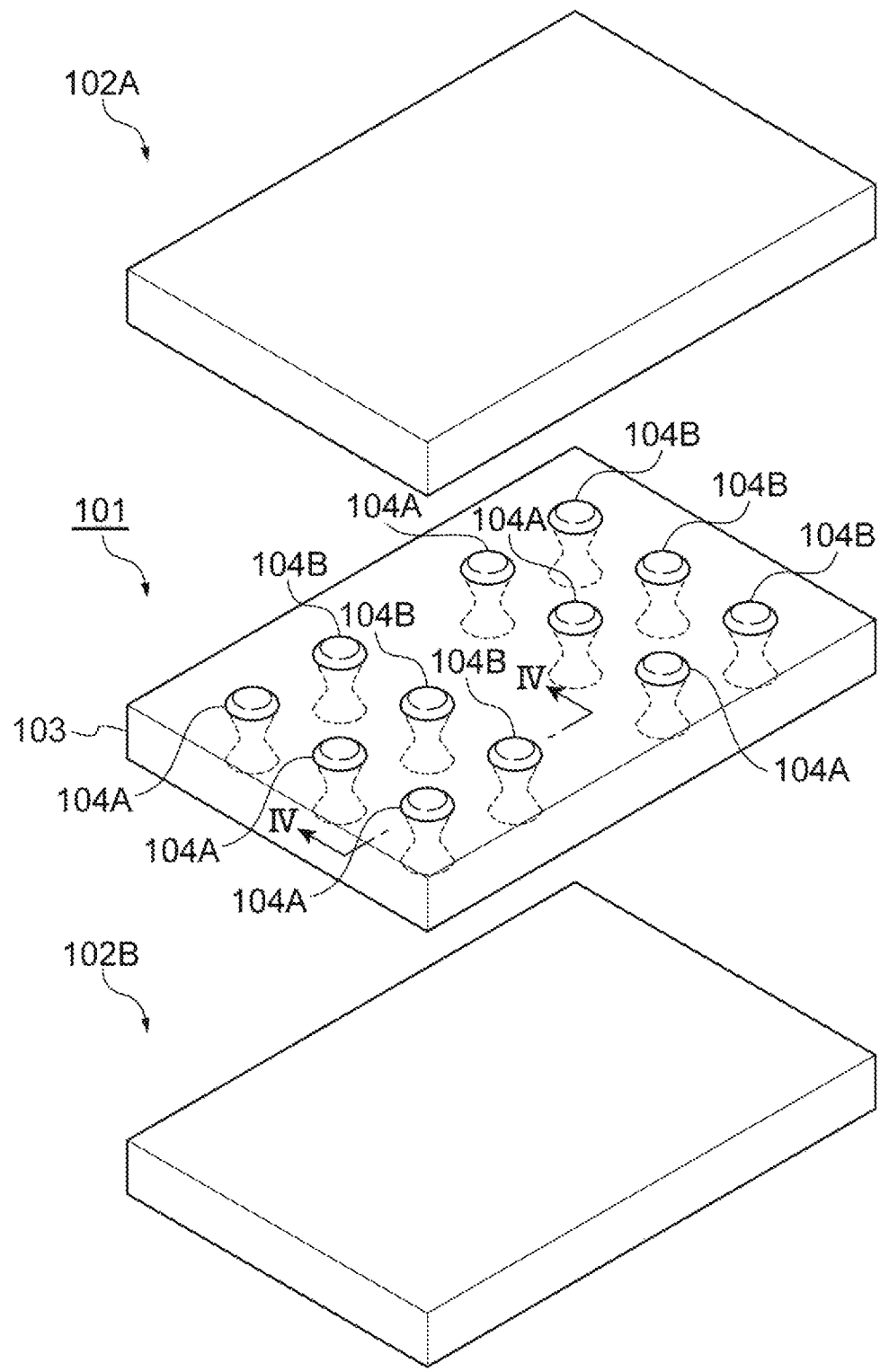
FIG. 3 is a perspective view illustrating a thin-film capacitor according to a third embodiment.

As illustrated in FIG. 3, the thin-film capacitor 101 according to the third embodiment is arranged so that it is sandwiched between a pair of electronic circuit boards 102A and 102B, and is used to form capacitance between the pair of electronic circuit boards 102A and 102B. The thin-film capacitor 101 and the pair of electronic circuit boards 102A and 102B constitute a component built-in substrate.

The thin-film capacitor 101 is configured to include a laminate 103 and a plurality of pairs of through electrodes 104A and 104B passing through the laminate 103. As an example, external dimensions of the thin-film capacitor 101 are 0.6 mm in long-side length, 0.3 mm in short-side length, and 0.15 mm in thickness. The thin-film capacitor 101 is a small-sized and large-capacity laminated capacitor and can be used as, for example, an on-vehicle capacitor, but is not limited to this application.

The laminate 103 has a laminated structure in which a plurality of layers are laminated and is configured to include a substrate 110, a laminated portion 120 laminated on one surface 110a of the substrate 110, and an insulating film 130 formed on the other surface 110b of the substrate 110.

The substrate 110 has a plate shape or a foil shape and is made of a metal such as, for example, Ni. The substrate 110 illustrated in FIG. 3 is a rectangular Ni foil.

The laminated portion 120 has a laminated structure in which a plurality of layers are laminated, and includes a substrate protection layer 121, a first electrode layer 122, a dielectric layer 123, a second electrode layer 124, and an insulating layer 125 which are arranged in this order from a direction close to the substrate 110.

The substrate protection layer 121 is made of an insulating material such as a metal oxide, and made of zirconium oxide ($ZrO_2$, $ZrO_{2.95}$, etc.) as an example. In addition to the zirconium oxide, for example, an oxide such as aluminum oxide ($Al_2O_3$, $Al_2O_{2.95}$, or the like), silicon oxide ($SiO_2$, $SiO_{2.95}$, or the like.), or barium titanate ($BaTiO_3$ or the like), a nitride such as silicon nitride (SiN, $Si_3N_4$, $Si_3N_{3.95}$, or the like), a carbide such as AlTiC, or a compound or mixture thereof can be adopted as the constituent material of the substrate protection layer 121.

The first electrode layer 122 is an internal electrode layer connected to one through electrode 104A among the paired through electrodes 104A and 104B. The first electrode layer 122 is made of a conductive material, and made of Ti as an example. Besides Ti, a metal such as Au, Ag, Pd, Ta, W, Ni, Cr, Cu, Al, or Fe, SUS, APC, or an alloy such as NiCr can be adopted as the conductive material constituting the first electrode layer 122.

The dielectric layer 123 is sandwiched between the first electrode layer 122 on the lower side and the second electrode layer 124 on the upper side and interposed between the electrode layers 122 and 124. The dielectric layer 123 is made of an insulating material such as a metal oxide, and made of $Al_2O_3$ as an example. Besides $Al_2O_3$, for example, $ZrO_2$, $HfO_2$, or $BaTiO_3$ can be adopted as the constituent material of the dielectric layer 123.

The second electrode layer 124 is an internal electrode layer connected to the other through electrode 104B among the paired through electrodes 104A and 104B. The second electrode layer 124 is made of a conductive material, and made of Cu as an example. Besides Cu, a metal such as Au, Ag, Pd, Ti, Ta, W, Ni, Cr, Al, or Fe, SUS, APC, or an alloy such as NiCr can be adopted as the conductive material constituting the second electrode layer 124.

The insulating layer 125 is made of an insulating material such as an insulating resin, and made of an epoxy resin as an example.

The insulating film 130 provided on the other surface 110b of the substrate 110 is made of an insulating material such as an insulating resin and made of a phenol resin as an example. The insulating film 130 covers the other surface 110b of the substrate 110 and covers an inner side surface 110c of the substrate 110 exposed by through holes 105A and 105B to be described below.

Figure 4:
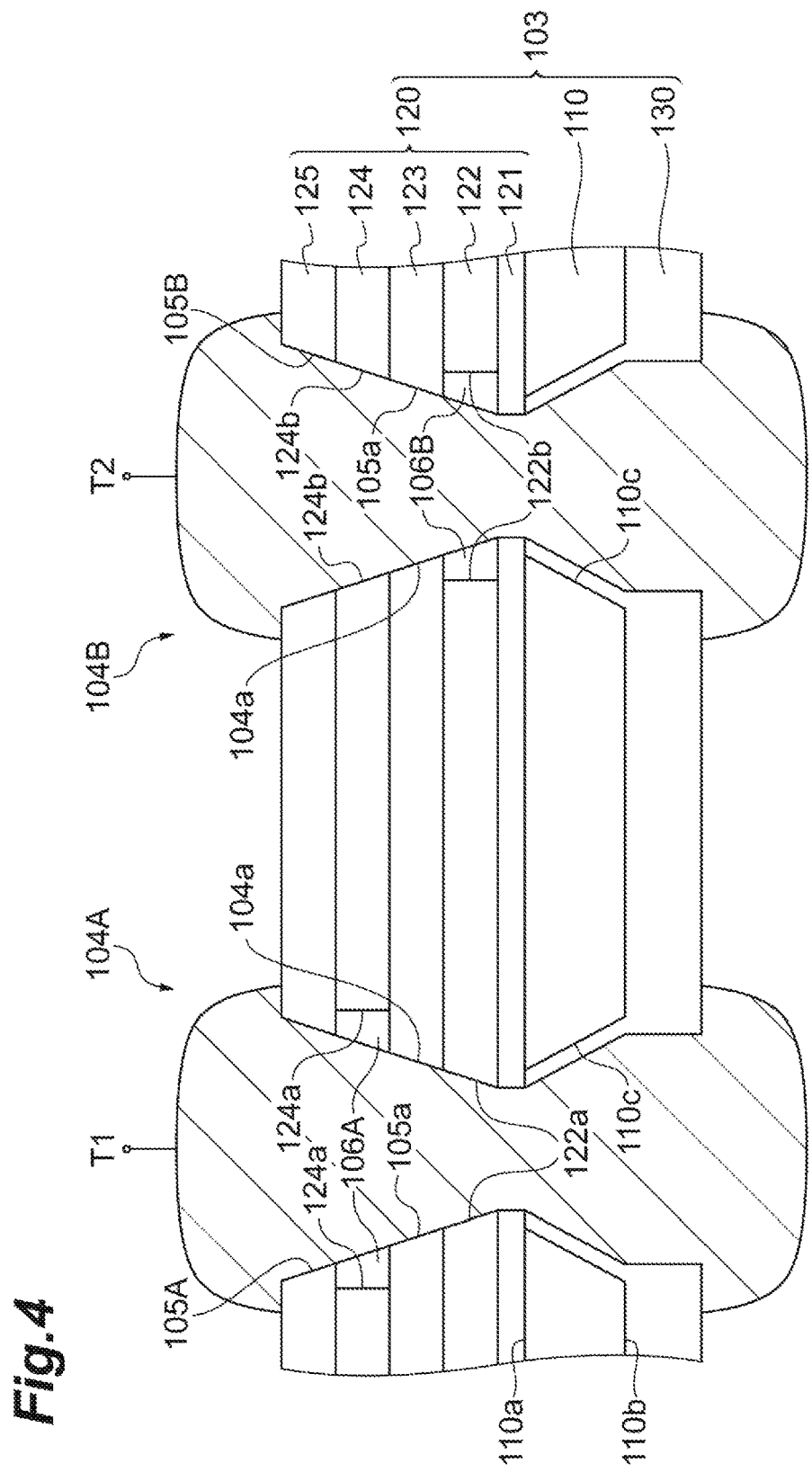
FIG. 4 is a cross-sectional view taken along the line IV-IV of the thin-film capacitor of FIG. 3.

The laminate 103 is provided with a plurality of through holes 105A and 105B extending in the laminating direction (that is, the thickness direction) and passing through the laminate 103. That is, the through holes 105A and 105B are provided to pass through the substrate 110, the laminated portion 120 and the insulating film 130 described above. As illustrated in FIG. 4, each of the through holes 105A and 105B has an inverted trapezoidal cross section which is gradually narrowed from the upper end surface of the laminated portion 120 to the substrate protection layer 121, and has a trapezoidal shape which is gradually widened from the substrate protection layer 121 to the insulating film 130.

Such through holes 105A and 105B can be obtained by forming holes in the front and back surfaces of the laminate 103 by etching or the like to make the holes communicate with each other. Thereby, the substrate 110, the laminated portion 120, and the insulating film 130 are exposed on an inner side surface 105a of each through hole 105A or 105B.

A plurality of through holes 105A and 105B form a pair with the first through hole 105A and the second through hole 105B which are arranged adjacent to each other, and are made of a plurality of pairs of through holes. Each pair of through holes 105A and 105B may be arranged so that they are arranged in, for example, a plurality of rows in a plan view of the laminate 103.

The plurality of pairs of through electrodes 104A and 104B are provided so that they pass through the through holes 105A and 105B provided in the laminate 103. Specifically, one through electrode (first through electrode) 104A among the paired through electrodes 104A and 104B is provided to pass through the first through hole 105A and connected to an external terminal T1 of the above-described electronic circuit boards 102A and 102B. The other through electrode (the second through electrode) 104B among the paired through electrodes 104A and 104B is provided to pass through the second through hole 105B, and connected to an external terminal T2 having polarity different from that of the external terminal T1 of the electronic circuit boards 102A and 102B. Each of the through electrodes 104A and 104B is made of a conductive material. As the conductive material, a metal such as Au, Ag, Pd, Ti, Ta, W, Ni, Cr, Cu, Al, or Fe, SUS, APC, or an alloy such as NiCr can be adopted.

An outer circumferential surface 104a of each through electrode 104A or 104B is provided along the inner side surface 105a of each through hole 105A or 105B. Each of the through electrodes 104A and 104B is connected to one of the first electrode layer 122 and the second electrode layer 124 exposed on the inner side surface 105a of the through holes 105A and 105B. Specifically, the first through electrode 104A is in contact with the first electrode layer 122 exposed on the inner side surface 105a of the first through hole 105A, but is not in contact with the second electrode layer 124. Also, the second through electrode 104B is in contact with the second electrode layer 124 exposed on the inner side surface 105a of the second through hole 105B, but is not in contact with the first electrode layer 122.

Here, connected states between the pair of through electrodes 104A and 104B and the pair of electrode layers 122 and 124 in the through holes 105A and 105B will be described in more detail with reference to FIG. 4.

As illustrated in FIG. 4, an inner circumferential surface 124a of the edge portion of the second electrode layer 124 surrounding the first through hole 105A is retracted away from the inner side surface 105a of the first through hole 105A. An inner circumferential surface 124b of the edge portion of the second electrode layer 124 surrounding the second through hole 105B is not retracted with respect to the inner side surface 105a of the second through hole 105B. An insulator 106A is arranged between the inner circumferential surface 124a of the edge portion of the second electrode layer 124 surrounding the first through hole 105A and the inner side surface 105a of the first through hole 105A. The insulator 106A can be made of various known insulating materials, and can be made of, for example, an insulating resin, a metal oxide such as $Al_2O_3$, TEOS, or the like.

An inner circumferential surface 122a of an edge portion of the first electrode layer 122 surrounding the first through hole 105A is not retracted with respect to the first through hole 105A. An inner circumferential surface 122b of the edge portion of the first electrode layer 122 surrounding the second through hole 105B is retracted away from the inner side surface 105a of the second through hole 105B. An insulator 106B is arranged between the inner circumferential surface 122b of an edge portion of the first electrode layer 122 surrounding the second through hole 105B and the inner side surface 105a of the second through hole 105B. Similar to the above-described insulator 106A, the insulator 106B can be made of various known insulating materials, and can be made of a metal oxide such as $Al_2O_3$, TEOS, or the like.

The connected states of the pair of through electrodes 104A and 104B and the pair of electrode layers 122 and 124 described above can be obtained by, for example, the following procedure.

(Step 1)

The substrate protection layer 121 is formed on one surface 110a of the substrate 110. As an example, a Ni foil having a thickness of 30 μm is used as the substrate 110, and a $ZrO_2$ layer (the substrate protection layer 121) having a thickness of 200 nm is formed on the Ni foil by sputtering.

(Step 2)

The first electrode layer 122, the dielectric layer 123, and the second electrode layer 124 are sequentially formed on the substrate protection layer 121 of step 1. As an example, a Ti layer (the first electrode layer 122) with a thickness of 200 nm, an $Al_2O_3$ layer with a thickness of 200 nm (a dielectric layer 123), and a Cu layer with a thickness of 200 nm (the second electrode layer 124) are sequentially formed by sputtering.

(Step 3)

The surface of the second electrode layer 124 of step 2 is covered with a resist having openings in portions corresponding to the through holes 105A and 105B. Specifically, after the entire surface of the second electrode layer 124 is covered with a resist, the openings are provided by performing predetermined exposure and development.

(Step 4)

Dry etching is performed using the resist of step 3 to form upper holes extending to the upper surface of the substrate protection layer 121 and serving as the through holes 105A and 105B. An opening diameter of each upper hole can be, for example, 100 μm.

(Step 5)

After step 4, a portion other than the upper hole serving as the first through hole 105A is covered with a resist and side etching of the upper hole serving as the first through hole 105A is performed with ammonium peroxodisulfate. The second electrode layer 124 (the Cu layer) exposed on the inner side surface 105a of the upper hole serving as the first through hole 105A is selectively etched with ammonium peroxodisulfate, and the inner circumferential surface 124a of the edge portion of the second electrode layer 124 surrounding the upper hole serving as the first through hole 105A is retracted away from the inner side surface 105a of the upper hole serving as the first through hole 105A. At this time, the side-etched length is 3 μm as an example. In the etching with the ammonium peroxodisulfate, the first electrode layer 122, the substrate protection layer 121, or the like is not substantially etched because an etching rate at which the substrate protection layer 121 (the $ZrO_2$ layer), the first electrode layer 122 (the Ti layer), or the like exposed on the inner side surface 105a of the upper hole serving as the first through hole 105A is etched is significantly lower than an etching rate at which the second electrode layer 124 (the Cu layer) is etched.

(Step 6)

After removal of the resist of step 5, a portion other than the upper hole serving as the second through hole 105B is covered with a resist and side etching of the upper hole serving as the second through hole 105B is performed with a mixed solution of hydrogen peroxide water and ammonia. The first electrode layer 122 (the Ti layer) exposed on the inner side surface 105a of the upper hole serving as the second through hole 105B is selectively etched with the mixed solution of hydrogen peroxide water and ammonia, and the inner circumferential surface 122b of the edge portion of the first electrode layer 122 surrounding the upper hole serving as the second through hole 105B is retracted away from the inner side surface 105a of the upper hole serving as the second through hole 105B. At this time, a side-etched length is 3 μm as an example. In the etching with the mixed solution of hydrogen peroxide water and ammonia, the second electrode layer 124, the substrate protection layer 121, or the like is not substantially etched because an etching rate at which the second electrode layer 124 (the Cu layer), the substrate protection layer 121 (the $ZrO_2$ Layer), or the like exposed on the inner side surface 105a of the upper hole serving as the second through hole 105B is etched is significantly lower than an etching rate at which the first electrode layer 122 (the Ti layer) is etched.

(Step 7)

After removal of the resist of step 6, covering with a positive resist is performed, development is performed after entire surface exposure, and a resin insulating layer is provided as the insulators 106A and 106B on the side-etched portions of the upper hole serving as the first through hole 105A and the upper hole serving as the second through hole 105B. As a manufacturing method of providing the insulators 106A and 106B on the side-etched portions, a manufacturing method using AHD or electrophoresis can also be adopted.

(Step 8)

The end surfaces of the electrode layers 122 and 124 which are not provided with the insulators 106A and 106B are exposed on the inner side surfaces 105a of the upper hole serving as the first through hole 105A and the upper hole serving as the second through hole 105B by oxygen plasma and Cu plating is performed after a seed layer is formed by sputtering in formation regions of the upper holes serving as the through holes 105A and 105B.

(Step 9)

The other surface 110b of the substrate 110 is covered with a resist having openings in portions corresponding to the through holes 105A and 105B. Specifically, after the entire other surface 110b of the substrate 110 is covered with a resist, the openings are provided by performing predetermined exposure and development.

(Step 10)

Wet etching is performed using the resist of step 9 and lower holes serving as the through holes 105A and 105B passing through the substrate 110 and extending to the lower surface of the substrate protection layer 121 are formed. Furthermore, the substrate protection layer 121 is penetrated by ion milling or RIE using a predetermined positive resist so that the upper hole and the lower hole communicate with each other, and the Cu plating filled in the upper hole is exposed.

(Step 11)

A permanent resist is patterned on the other surface 110b of the substrate 110 from which a central portion of the lower hole is excluded to form the insulating film 130. The insulating film 130 covers the other surface 110b and the inner side surface 110c of the substrate 110.

(Step 12)

A Cu plating is formed on the lower holes serving as the through holes 105A and 105B and is electrically connected to the Cu plating of the upper hole. Thereby, the through electrodes 104A and 104B passing through the through holes 105A and 105B are obtained.

As described above, the metal materials (Ti and Cu in the present embodiment) constituting the pair of electrode layers 122 and 124 are made different from each other, and a structure in which only one electrode layer 122 is exposed in one through hole 105A and only the other electrode layer 124 is exposed in the other through hole 105B is obtained by performing side etching of the through holes 105A and 105B using two types of etchants for selectively etching the metal materials (ammonium peroxodisulfate and a mixed solution of hydrogen peroxide water and ammonia in this embodiment).

Thus, a capacitor structure having a simple configuration can be easily formed between both the through holes 105A and 105B merely by providing the through electrodes 104A and 104B passing through the through holes 105A and 105B after the through holes 105A and 105B are formed in the laminated portion 120 with a predetermined etchant.

As described above, in the above-described thin-film capacitor 101 according to the third embodiment, a capacitor structure in which the first through hole 105A and the second through hole 105B passing through the laminate 103 are provided, and the first electrode layer 122 in contact with the first through electrode 104A and the second electrode layer 124 in contact with the second through electrode 104B are laminated with the dielectric layer therebetween is formed. In such a capacitor structure, by providing the first through hole 105A and the second through hole 105B similar to each other and the pair of through electrodes 104A and 104B in the laminate 103, the number thereof can be easily increased.

In particular, in the thin-film capacitor 101, because the capacitor structure is formed in the laminating direction (that is, the thickness direction) of the laminate 103, it is possible to easily reduce a formation region thereof as compared with when the capacitor structure is formed in a plane. In the third embodiment, combinations of two types of metal materials constituting the pair of electrode layers 122 and 124 and two types of etchants for selectively etching the metal materials are as shown in the following Table 7.

TABLE 7

| | Constituent material | Etchant |
|---|---|---|
| First electrode layer | Ti | Mixed solution of hydrogen peroxide water and ammonia |
| Second electrode layer | Cu | Ammonium peroxodisulfate |
| Substrate protection layer | $ZrO_2$ | |

The combination of the constituent material and the etchant shown in Table 7 can be appropriately exchanged. The combinations of two types of metal materials constituting the pair of electrode layers 122 and 124 and two types of etchants for selectively etching the metal materials are not limited to the combinations in Table 7 and can also be combinations of the above-described Tables 1 to 6.

The pair of through electrodes 104A and 104B are provided so that they are arranged in one direction or in a lattice shape to form capacitor structures connected in series or in parallel. That is, merely by performing etching formation of the through holes 105A and 105B in the laminate 103 and plating formation of the through electrodes 104A and 104B passing through the through holes 105A and 105B using the above-described manufacturing method, a plurality of capacitor structures can be easily formed.

As illustrated in FIG. 3, only a single capacitor structure is provided even when a plurality of pairs of through electrodes 104A and 104B are provided in the laminate 103, but the capacitor structure may be separated into a plurality of capacitor structures as necessary. Also, because there is in-plane fluctuation in a single capacitor structure, it is possible to connect a plurality of through electrodes having the same polarity.

Also, by adjusting a separation distance between the first through hole 105A and the second through hole 105B, the capacitance of the capacitor structure provided between the first through hole 105A and the second through hole 105B can be easily adjusted. Furthermore, it is possible to easily form a plurality of capacitor structures having different capacitances in one laminate 103.

Although some of the thin-film capacitors according to the conventional technology have a laminate having a configuration in which narrower layers are laminated on a wide layer, it is necessary to provide a different mask for each layer in the laminate having a cross section of a trapezoid having such a stepped side surface and a work process and cost are increased. On the other hand, according to the above-described thin-film capacitor 101, it is unnecessary to provide different masks for each layer and it is possible to reduce the work process and cost because the formation of the through holes 105A and 105B in the laminate 103 is completed with only two removing steps (etching, ion milling, or the like) of an upper hole and a lower hole. As the work process, 20 exposure and development operations are required according to the conventional technology when a laminate having a 10-layer structure is considered, but it is sufficient to perform exposure and development four times in the manufacturing method according to the above-described third embodiment. Also, because superposition with high precision is unnecessary in the manufacturing method according to the above-described third embodiment, a simple method such as printing can be used.

Also, according to the above-described thin-film capacitor 101, wiring routing can be reduced as compared with the conventional technology. This makes it easy to adjust series resistance and equivalent series inductance, and an adjustment range on a low series resistance side expands particularly.

Furthermore, according to the thin-film capacitor 101, because the through electrodes 104A and 104B are small in size, the number of terminals of the through electrodes 104A and 104B can be easily increased. For example, because a degree of freedom for a position of a terminal in the thin-film capacitor 101 is also increased, when the thin-film capacitor 101 is embedded in a component built-in substrate (that is, when the thin-film capacitor 101 is sandwiched between the pair of electronic circuit substrates 102A and 102B), a degree of freedom of an arrangement increases and optimization of substrate design is facilitated.

The thin-film capacitor is not limited to the above-described embodiment, and can be variously changed.

For example, although the laminate 103 has a single capacitor structure in a laminating direction (that is, a structure in which a one layered dielectric is sandwiched between a first electrode layer and a second electrode layer), a laminate having a plurality of capacitor structures in a laminating direction obtained by alternately laminating a plurality of first electrode layers and a plurality of second electrode layers with a dielectric therebetween may be formed.

Also, the insulators 106A and 106B are not provided and voids may be formed in portions of the insulators 106A and 106B. In this case, a non-contact state between the through electrode and the electrode layer can be realized by air or gas inside the voids.

What is claimed is:

1. A thin-film capacitor comprising:
   a laminate having a laminated structure including a first electrode layer and a second electrode layer laminated between one end surface side of the laminate and another end surface side of the laminate along a lamination direction, and a dielectric layer interposed between the first electrode layer and the second electrode layer in the lamination direction;
   a first groove portion and a second groove portion provided on the one end surface side of the laminate and each extending in the laminating direction, the first groove portion and the second groove portion each having a width in a separation direction that is perpendicular to the lamination direction and that is along a direction in which the first groove portion and the second groove portion are separated from each other, each of the width of the first groove portion and the width of the second groove portion being narrowed from the one end surface side to the other end surface side of the laminate; and
   a pair of extraction electrodes configured to cross the first groove portion and the second groove portion, respectively, and provided along two side surfaces of each of the first groove portion and second groove portion, the two side surfaces of the first groove portion facing each other in the separation direction, the two side surfaces of the second groove portion facing each other in the separation direction, each of the first electrode layer and the second electrode layer extending over both sides of the first groove portion and both sides of the second groove portion and having portions exposed on both side surfaces of the first groove portion and on both side surfaces of the second groove portion,
   wherein a first extraction electrode provided in the first groove portion among the pair of extraction electrodes is in contact with the first electrode layer exposed on the side surface of the first groove portion and is not in contact with the second electrode layer, and
   wherein a second extraction electrode provided in the second groove portion among the pair of extraction electrodes is in contact with the second electrode layer exposed on the side surface of the second groove portion and is not in contact with the first electrode layer.

2. The thin-film capacitor according to claim 1, wherein an end surface of the second electrode layer on the first groove portion side is retracted away from the side surface of the first groove portion.

3. The thin-film capacitor according to claim 2, wherein an insulator is provided between the end surface of the second electrode layer on the first groove portion side and the side surface of the first groove portion.

4. The thin-film capacitor according to claim 1, wherein an end surface of the first electrode layer on the second groove portion side is retracted away from the side surface of the second groove portion.

5. The thin-film capacitor according to claim 4, wherein an insulator is provided between the end surface of the first electrode layer on the second groove portion side and the side surface of the second groove portion.

6. The thin-film capacitor according to claim 1, further comprising a substrate protection layer having insulation property provided on the other end surface side of the laminate.

7. The thin-film capacitor according to claim 1, further comprising a substrate provided on the other end surface side of the laminate, the substrate having a strip shape.

8. The thin-film capacitor according to claim 1, wherein the first electrode layer and the second electrode layer are made of different materials.

9. The thin-film capacitor according to claim 8, wherein the first electrode layer is made of Pd and the second electrode layer is made of Ni.

\* \* \* \* \*